3,142,703
Patented July 28, 1964

3,142,703
TRIFLUOROALKOXY - SUBSTITUTED ANILIDES AND GERMICIDAL COMPOSITIONS OBTAINED THEREWITH
Herbert C. Stecker, 113 Hollywood Ave., Hohokus, N.J.
No Drawing. Filed Apr. 20, 1962, Ser. No. 188,942
6 Claims. (Cl. 260—559)

This invention relates to novel trifluoroalkoxy-substituted anilide compounds and to germicidal compositions made therewith. More specifically, it deals with anilide compounds having an anilide benzene nucleus bearing at least one and not more than three trifluoroalkoxy substituents, and to the carboxyl group to which is attached a substituted or unsubstituted aryl, alkyl, aralkyl or alkaryl moiety, and to germicidal compositions made therewith.

The compounds which are the subject of the present invention have the general empirical formula as follows:

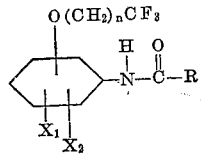

where $X_1$ and $X_2$ are substituents of the class consisting of hydrogen, —$CF_3$, $R_1CF_3$, —$O(CH_2)_nCF_3$ and halogen, $n$ is an integer ranging from 1 to 5, R is a radical of the class comprising substituted and unsubstituted alkyl, aryl, alkaryl and aralkyl groups having no more than 12 carbon atoms, and $R_1$ is an alkyl group having not more than 3 carbon atoms.

Germicidal compounds have been disclosed in the art (e.g., U.S. Patent 2,703,332 and Brit. Patent 745,607) wherein a trifluoromethyl substituent has been directly attached to the anilide nucleus. However, such compounds are quite soluble, relatively speaking, so that they are leached out too rapidly when used in textile-treating, paper-treating, plastic-treating, and similar compositions. According to the present invention, strongly germicidal compounds which have more limited solubility, are prepared, such compounds exerting even greater germicidal effect than the prior art salicylanilide compounds, in spite of their low solubility rates.

In the compounds of the present invention, the radicals $X_1$ and $X_2$ may be hydrogen, a halogen such as chlorine, bromine, iodine, or fluorine, or —$CF_3$, —$R_1CF_3$, or —$O(CH_2)_nCF_3$. The radical R may be a benzyl group or a phenyl group, unsubstituted, or bearing one to three substituents such as —$NH_2$, $NO_2$, —$COONa$, —$OH$, —$Cl$, —$Br$, —$I$, —$F$, or an alkyl group such as —$CH_3$, $C_3H_7$, —$C_4H_8$, —$(CH_2)_{10}CH_3$, or substituted alkyl group, such as —$CF_3$, —$CH_2Cl$, —$C_8H_{17}I$, and the like. Typical compounds, made in accordance with the present invention, include 5-fluoro-3'-trifluoromethyl-2-trifluoro-methoxy salicylanilide, 3'-trifluoro-methyl - 5' - trifluoroethoxy salicylanilide, 3'5'-bistrifluoromethoxy-3 - nitrosalicylanilide, 3-bromo-5'-trifluoropropoxy-4-amino-benzanilide, 2', 5'-bis-trifluoroethoxy-4'-iodo-3,5-difluorosalicylanilide, 3- trifluoroethoxy-5-chloro-chloroacetanilide, 2,3,5-tristrifluoroethoxy-fluoropropionylanilide, 3' - trifluoroethoxy - 5'- chloro-3-iodosalicylanilide, 2-bromo-3 - trifluoromethoxy-trifluoroacetanilide, and the like.

A typical method of preparation of the compounds of the present invention is apparent from the following example:

EXAMPLE

*5-Fluoro-3'-Trifluoromethyl-6'-Trifluoroethoxy Salicylanilide*

Forty-seven parts by weight of 3-trifluoromethyl-6-trifluoroethoxy-aniline and 31 parts of 5-fluorosalicylic acid are added to 450 parts of chlorobenzene, and 12 parts of phosphorus trichloride are then added with 1 part of aluminum chloride. The mixture is refluxed until hydrogen chloride ceases to be generated, after which water is added, and the mixture is made alkaline with trisodium phosphate. After steam distillation of the chlorobenzene, the product is removed by filtration.

Similar products may be obtained by using, for example, 3,6-bistrifluoroethoxy aniline instead of 3-trifluoroethoxy aniline to produce 5-fluoro-3',6'-methyl-6-trifluoroethoxy salicylanilide, or using 5-bromo-salicylic trifluoroethoxy salicylanilide, 3'5'-bistrifluoromethoxy-3 - nitrosalicylanilide, 3-bromo-5'-trifluoropropoxy-4-amino-benzanilide, 2', acid, instead of 5-fluorosalicylic acid, for example, to produce 5-bromo-3'-trifluoromethyl-6'-trifluoroethoxy salicylanilide.

Table I lists a number of compounds prepared in accordance with the process outlined above, and gives their solubilities and microbial inhibiting power in parts per million against *S. aureus* and *S. choleraesuis*, the inhibiting power being determined as follows:

Serial dilutions were made with each germicide and each concentration level was tested in triplicate against the designated microorganism in a nutrient broth medium to determine the minimum concentration required to inhibit growth of the microorganism. The presence or absence of growth was determined by the development of a haze or cloud in the otherwise clear growth medium and no attempt was made to determine whether the microorganism was killed or merely inhibited in its growth.

These compounds have been found to be excellent mildew-proofing and germicidal agents for fibrous materials such as cloth, leather, paper, wood, and the like. Treatment of the fibrous material may be made with a solution or dispersion of the germicide in a liquid medium, leaving about 0.001% to 0.05% or 0.1% or even 0.5%, or as much as 5.0% by weight of germicide in the fibrous material.

The germicides of the present invention also may be incorporated in plastics, such as rubber, polyethylene, polystyrene, polyurethane, nylon, and similar plastoform and elastoform compositions by incorporating the germicide in an amount of 0.001% to 0.05% or even 0.1% or as much as 0.5% and 5.0% in the batch which is mixed or kneaded prior to vulcanization, extrusion or other forming operation.

The compounds of the present invention are particularly valuable in detergent and toilet detergent compositions, in the amount of 0.001% to 0.01% by weight and to about 0.5% or even 1.0%, 2%, 5%, or even 10%. They may be admixed in commercial toilet soaps, such as the neutral high grade sodium and potassium salts of fatty acids from tallow, olive oil, palm oil, and the like, above or with non-soap synthetic detergents, e.g., non-ionic, anionic, or cationic.

The term "detergent" employed herein includes fatty acid soaps, as well as synthetic detergents, and other detergents, such as fatty alcohol sulfates, fatty acid amides, sodium tripolyphosphates, and combinations thereof. The term "toilet soap" used herein also is employed in its popular meaning, that is, those compositions employed for cleansing the skin and prepared from an alkaline metal product, such as potassium or sodium hydroxide and a fat or fatty acid, both saturated and unsaturated. The compositions described herein also include other antiseptic agents, emollients, water softeners, antioxidants, dyes, perfume, "cold cream" additives, and the like.

The germicidal compounds of the present invention may be used with anionic detergents, such as sodium hexadecyl sulfate, or with cationic detergents, as exemplified by dimethyl-stearamidopropyl-2-hydroxyethyl ammonium dihydrogen phosphate, or with non-ionic detergents, such as polyoxypropylene polyoxyethylene condensates, alone or in admixture with other detergents heretofore enumerated. They are also effective in scouring powders, detergent cleaners, and the like.

wherein:
$X_1$ and $X_2$ are members of the class consisting of hydrogen, $CF_3$, $R_1CF_3$, $O(CH_2)_nCF_3$, and halogen,
$n$ is an integer of 1 to 5,

TABLE I

| No. | Compound | Solubility | | | Antimicrobial Activity (p.p.m.) Against | |
|---|---|---|---|---|---|---|
| | | Water | Alcohol | Polyethylene Glycol | S. aureus | S. choleraesuis |
| 1 | 2-Br-4-OCH₂CF₃ anilide of 3,5-dibromosalicylic acid | Insol | Sl. Sol | Sol | 0.1 | 0.1 |
| 2 | 2-CF₃-4-OCH₂CF₃ anilide of 5-fluorosalicylic acid | Insol | Sl. Sol | Sl. Sol | 0.2 | 0.2 |
| 3 | 2-CF₃-4-O(CH₂)₅CF₃ salicylanilide | Insol | Sl. Sol | Sl. Sol | 0.3 | 0.3 |
| 4 | 2,4-bis(OCH₂CF₃)-3-Br anilide of 3,5-dibromosalicylic acid (with OCH₂CF₃) | Insol | V. Sl. Sol | Sol | 0.2 | 0.3 |
| 5 | 2,4-bis[O(CH₂)₂CF₃] anilide of 5-bromosalicylic acid | Sl. Sol | Sl. Sol | Sol | 0.5 | 0.6 |
| 6 | 2,4-bis(OCH₂CF₃)phenyl-NH-CO-CH₂-C₆H₃(OH)(COOH) | Sl. Sol | Sl. Sol | Sol | 0.7 | 0.8 |
| 7 | 2-Br-4-OCH₂CF₃-phenyl-NH-CO-CH₂-CH₃ | Insol | Sl. Sol | Sl. Sol | 0.7 | 0.7 |
| 8 | 2,4,6-tris(OCH₂CF₃)phenyl-NH-CO-CF₃ | Insol | Sl. Sol | Sl. Sol | 0.9 | 0.9 |
| 9 | 2-Br-4-CF₃CH₂O-phenyl-NH-CO-(CH₂)₁₉CH₃ | Insol | Sl. Sol | Sl. Sol | 0.8 | 0.9 |
| 10 | 4-CF₃CH₂O-phenyl anilide of 3-chloro-5-methylsalicylic acid | Insol | Sl. Sol | Sol | 0.5 | 0.6 |

I claim:
1. A compound of the formula:

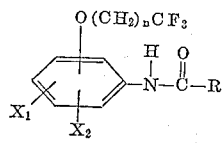

wherein $X_1$ and $X_2$ are as defined;

R is a radical of the class consisting of phenyl, benzyl and alkyl groups, having not more than 12 carbon atoms, and
$R_1$ is an alkyl group having not more than 3 carbon atoms.

2. 5-halo-3'-trifluoro-methyl-2-trifluoromethoxy salicylanilide.

3. 3'-trifluoromethyl-5'-trifluoroethoxy salicylanilide.

4. 2',5'-bistrifluoromethoxy-4'-dihalo salicylanilides.
5. 3-trifluoroethoxy-5-halo-chloracetanilide.
6. 3-halo-3'-trifluoroethoxy-5'-halo salicylanilide.

References Cited in the file of this patent

UNITED STATES PATENTS

| | | |
|---|---|---|
| 2,172,698 | Clayton et al. | Sept. 12, 1939 |
| 2,703,332 | Bindler et al. | Mar. 1, 1955 |
| 2,727,007 | Little et al. | Dec. 13, 1955 |
| 2,752,393 | Martin | June 26, 1956 |
| 2,893,881 | Sakornbut | July 7, 1959 |
| 2,901,508 | Korman | Aug. 25, 1959 |
| 2,921,961 | Muller et al. | Jan. 19, 1960 |
| 2,965,575 | Beaver et al. | Dec. 20, 1960 |
| 3,021,368 | Blank et al. | Feb. 13, 1962 |
| 3,041,187 | Jordan et al. | June 26, 1962 |
| 3,058,881 | Wilde | Oct. 16, 1962 |

FOREIGN PATENTS

| | | |
|---|---|---|
| 770,411 | Great Britain | Mar. 20, 1957 |

OTHER REFERENCES

Yagupolskii et al.: Chemical Abstracts, vol. 50, page 13,793 (1956), QD1 A51.

Yagupolskii et al.: Chem. Abstracts, vol. 47, page 4771 (1953), QD1 A51.